March 8, 1955  S. G. MARRIOTT  2,703,521
BUN TREATING MACHINE

Filed Oct. 13, 1953  2 Sheets-Sheet 1

INVENTOR.
SHERMAN G. MARRIOTT
BY
F.R.Geisler.
ATTY.

March 8, 1955  S. G. MARRIOTT  2,703,521
BUN TREATING MACHINE

Filed Oct. 13, 1953 2 Sheets-Sheet 2

INVENTOR.
SHERMAN G. MARRIOTT
BY
*F. R. Geisler*
ATTY.

United States Patent Office 2,703,521
Patented Mar. 8, 1955

2,703,521

BUN TREATING MACHINE

Sherman G. Marriott, Portland, Oreg.

Application October 13, 1953, Serial No. 385,856

3 Claims. (Cl. 99—355)

The present invention relates to the preparing of sliced bread buns for immediate use for "hamburger" sandwiches and the like, including the customary toasting of the bun halves and the subsequent application of butter, mayonnaise, or other dressing or sauce to the toasted bun faces preparatory to bringing the bun halves and the "hamburger" together and forming the same into sandwiches.

The invention relates in particular to a bun toasting machine of the type described in my U. S. Patent No. 2,225,068, issued under date of December 17, 1940, to which reference should be made, and the present invention is concerned with an improvement for and an addition to the bun toasting machine described in the said patent.

The machine of the patent causes the cut faces of the bun halves to be subjected to the desired toasting and it discharges the toasted bun halves at the end of the machine. Heretofore it has been necessary to apply butter (or other materials used in place of butter) to the toasted bun halves by hand after they have left the machine.

The object of the present invention is to provide an improved bun treating machine which will not only give the desired toasting to the buns but will also automatically apply butter (or other materials) to the toasted faces of the bun halves immediately upon completion of the toasting operation.

A related object of the invention is to provide a practical means for applying butter (or other materials) to bun halves which will operate in conjunction with the toasting of the bun halves, but the use and operation of which will be optional.

Another object of the invention is to provide improved means for applying butter (or other materials) to sliced buns, bread slices, and the like, as these are toasted, which means will be easy to clean and easy to service.

A further object of the invention is to provide a butter-applying attachment which will be of simple construction as well as practical, and relatively inexpensive to manufacture.

These objects and incidental advantages I obtain by providing a bun toasting machine with a removable container for butter (or other materials), having rotating butter-applying rollers over which the buns pass after toasting, with the container, rollers, and roller-rotating means being constructed and mounted and made to operate as hereinafter briefly described, with reference to the accompanying drawings.

Figure 1:
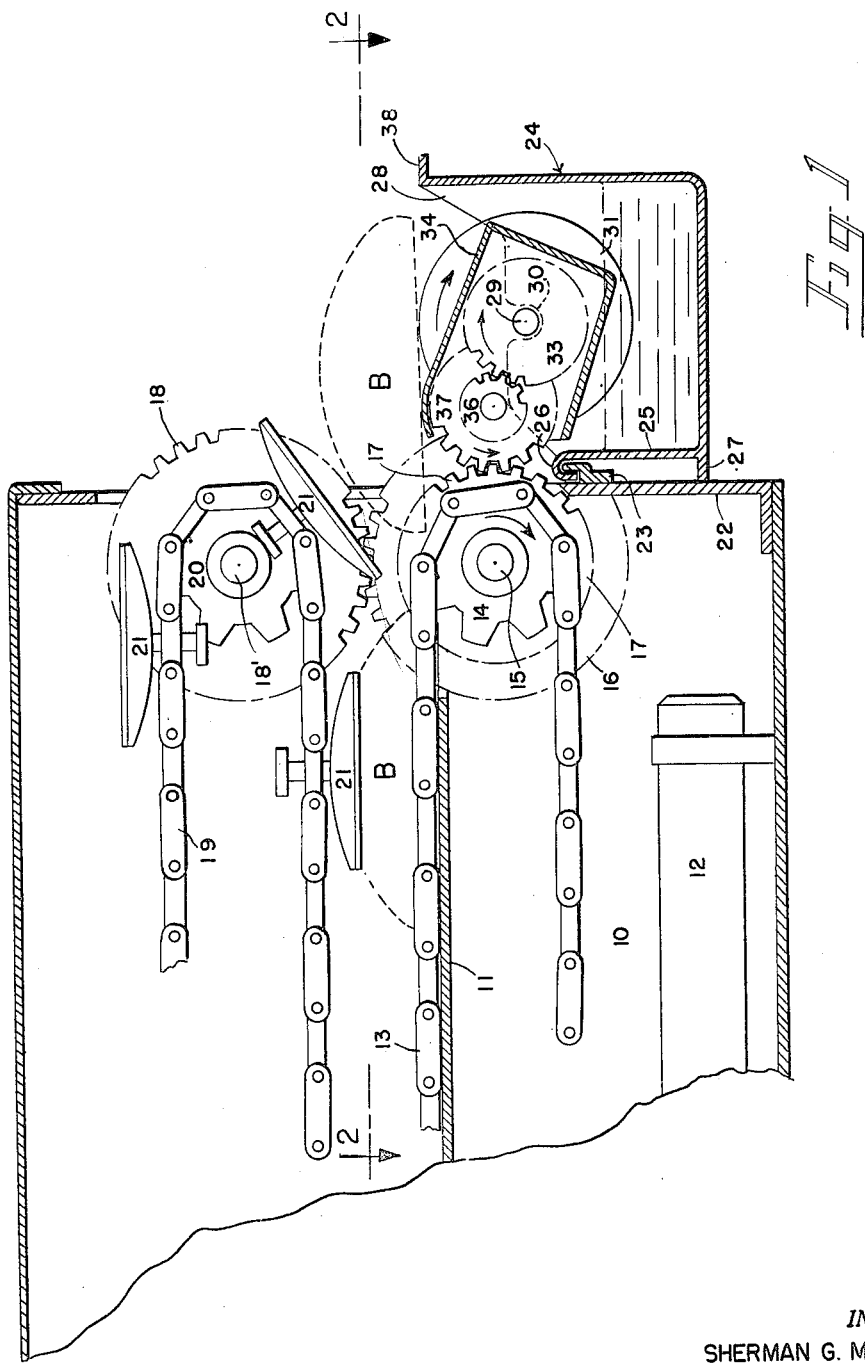
Figure 1 is a fragmentary sectional elevation of the rear portion of a bun-toasting machine showing the butter-applying means in operation, this sectional elevation being taken on the line indicated at 1—1 in Figure 2, but drawn to a larger scale.

The bun toasting machine, which resembles the machine of the previously mentioned U. S. Patent No. 2,225,068, includes a lower oven 10 (Figure 1) covered by a top plate 11. Suitable adjustable heating means is provided in the oven 10, such, for example, as electric heating elements, one of which is indicated at 12 in Figure 1, or suitable gas burners, in order that the top plate 11 will be maintained at the proper temperature to cause the desired toasting of the bun faces in contact with the plate 11 during the time the bun halves are moved along the plate 11 to the discharge end of the same.

The bun halves, with their sliced faces down on the toasting plate 11, are moved along (from left to right as viewed in Figures 1 and 2) by two identical conveyors, each composed of a pair of endless chains 13. These chains 13 are driven in unison by four sprockets 14 (Figure 2) keyed on a shaft 15. The shaft 15 extends through the side walls of the oven 10, being rotatably supported in suitable journal in the walls, and the further end of the shaft 15, as viewed in Figure 2, extends for some distance beyond the side wall of the oven and carries a gear 16. An end pulley (not shown) on the shaft 15 has a belt connection with a suitable speed reducing means and motor (not shown) through which the shaft 15 and the sprockets 14 are rotated (the rotation being in clockwise direction as viewed in Figure 1).

The upper stretches of the endless chain 13 rest on the toasting plate 11. Flights or transverse bars 39 (Figure 2) are attached at regular intervals to each pair of chains and push the bun halves B along the toasting plate. A pair of endless chains, a portion of one of which is shown at 19 in Figure 1, are located in a compartment above the toasting plate 11, each of the chains 19 being positioned above the center line of each pair of the lower chains 13 or flights. The upper chains 19 carry weights 21 positioned above the spaces between the flights of the lower chains and these weights 21 press down on the bun halves in order to keep the faces of the buns to be toasted pressed flat against the toasting plate 11, as described more fully in U. S. Patent No. 2,225,068. The upper chains 19, with their weights 21 travel at the same speed as the lower chains and pass over sprockets 20 secured on a shaft 18'. A gear 18, keyed on the end of shaft 18' meshes with gear 16 on shaft 15, both gears being of the same size so that the sprockets 20 for the upper chains will travel at the same speed as the sprockets 14 for the lower chains.

A central gear 17 is keyed on the shaft 15 between the two pairs of flight chains 13. The rear wall 22 of the oven 10 is cut away at the top, as shown in Figure 1, and the central gear 17 is of such size and the shaft 15 is so positioned that the gear 16 preferably extends a slight distance beyond the line of the rear wall 22.

A trough-like receptacle or butter-container, designated as a whole by the reference character 24 (Figure 1), has a short front wall 25 which terminates at the top in a hook-shaped or downwardly-curved flange 26. A bracket 23 is mounted on the outer face of the rear wall 22 of the toaster oven for engagement by the flange 26. The bottom of the container 24 preferably, though not necessarily, has an extension 27 to bear against oven wall 22 so as to enable the container 24 to be supported in the position illustrated in Figure 1 when the flange 26 is set in place on the bracket 23. The rear wall of the container 24, when the container is mounted in place, extends up substantially to the plane of the toasting plate 11 and terminates in a rearwardly-extending top flange 38. Each of the end walls 28 of the container is shaped as indicated in part by the broken lines in Figure 1 and each end wall has a center groove 30 so formed as to provide a support for an end of a rotatable shaft 29.

Figure 2:
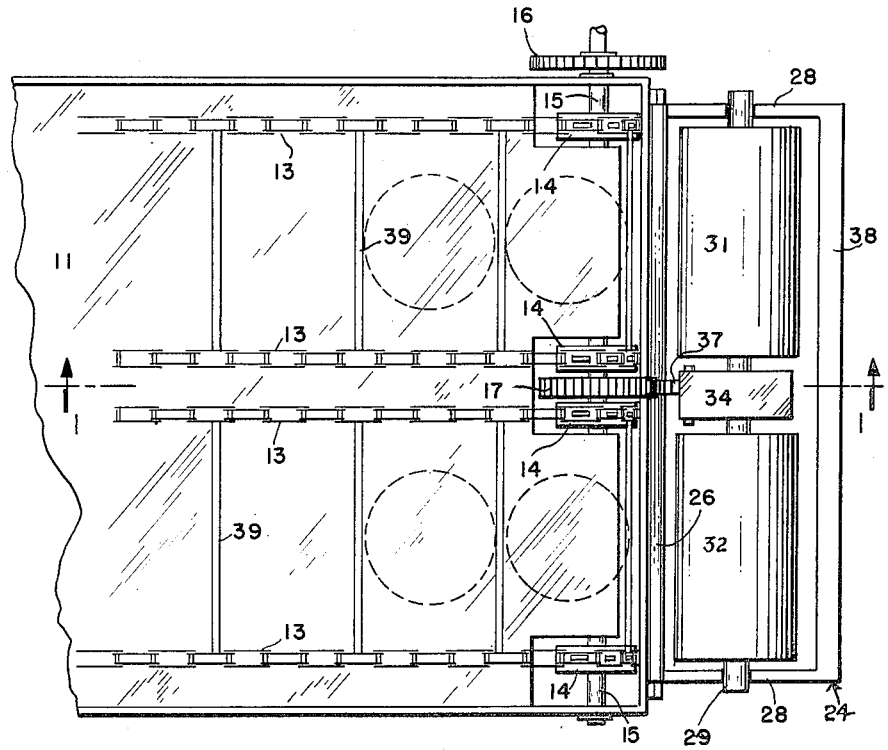
Figure 2 is a fragmentary plan section of the same portion of the machine taken on the line indicated at 2—2 in Figure 1 but drawn to a smaller scale.
Figure 3:
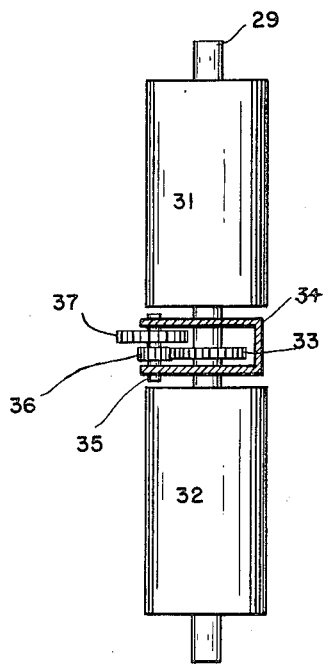
Figure 3 is a plan view of the butter-applying rollers, showing the same removed from the butter container but with the central gear housing shown in section for the purpose of clarity.

A pair of identical rollers 31 and 32 are secured on, or formed integral with, the shaft 29, in spaced position as shown in Figures 2 and 3, and are so arranged that when the shaft 29 with the rollers 31 and 32 is set in the container or trough 24 the tops of these two rollers will be in alignment with the travel of the bun halves as the bun halves are delivered from the two pairs of flight chains 13 at the discharge end of the toasting plate 11.

A center gear 33 (Figures 1 and 3) is secured on the shaft 29 between the rollers 31 and 32. A housing 34, shaped as shown in Figure 1, having top, bottom, rear and side walls, but open in front, is pivotally supported on the shaft 29. A stub shaft 35 (Figure 3) is rotatably supported by the housing 34. A small gear 36 and a larger gear 37 are keyed to the shaft 35, the small gear meshing with the gear 33 as shown.

When the container 24 is mounted on the rear wall of the toaster, the shaft 29 with the rollers 31 and 32 is set in place in the container, the housing 34 being first tilted upwardly, or clockwise (as viewed in Figure 1), and then permitted to drop back until the gear 37 rests against and meshes with the driven gear 17 of the toaster. Now the rotation of the gear 17 (in clockwise direction) will result in rotation of the rollers 31 and 32 in the same direction.

Melted butter (or any other material desired to be applied to the toasted faces of the buns B) is placed in the container 24. The heat from the adjacent oven 10 will keep the butter (or other material) in warm and liquid condition. The shaft 29 is set in place, causing the rollers 31 and 32 to extend down into the melted butter, and the gear 37 is brought into meshing engagement with the gear 17, the housing 34 then resting in the position illustrated in Figure 1 and being supported in part by the engagement of the gear 37 with the gear 17. As the toasted bun halves B reach the right hand end of the toaster (as viewed in Fig. 1) they are moved into contact with the rotating rollers 31 or 32. These rotating rollers not only cause the bun halves to continue their travel further and thus to travel over the top of the container 24, but part of the melted butter which is carried on the surface of the rotating rollers adheres to the toasted faces of the bun halves. The fact that the toasted faces of the bun halves are warm when brought into contact with the butter-conveying rollers facilitates the application of the melted butter to the toasted faces and its slight penetration into the faces. The buttered bun halves then move over the top rear flange 38 of the container 24 whereupon they drop into a suitable receptacle (not shown).

When it is not desired to spread butter (or other material) on the toasted bun halves before they are made into sandwiches the container 24 with the rollers and gears can be quickly and easily lifted from the toaster.

The cleaning of the container presents no problem whatever since the roller assembly can be lifted from the container and immersed in hot water, while the container itself is also very easily cleaned.

Although my invention has been described as employed for the toasting and buttering of the sliced buns, it can, of course, also be used for ordinary bread slices. Minor modifications might be made in the shape of the container and in the mounting for the shaft 29, and also in the mounting and arrangement of the gears through the medium of which the applicator rollers are rotated. However, I consider the form in which I have illustrated and described my invention to be preferable and have found this particular form of my device to be very satisfactory and practical, especially because of its simplicity.

I claim:

1. In a bun treating machine of the character described, an oven, a toasting plate on said oven, a pair of conveyors moving on said plate for sliding bun halves along said plate, a driven shaft located near the discharging end of said toasting plate and near the end of said oven, said shaft connected with said pair of conveyors, a gear centrally located on said shaft between said pair of conveyors, said gear extending slightly beyond the end of said oven, an end wall on said oven, an opening in said end wall for said gear, a trough-like container having front, rear, end and bottom walls, means for removably mounting said container on the rear of said oven beyond and below the discharging end of said toasting plate, a shaft removably and rotatably supported on the end walls of said container, a pair of identical spaced applicator rollers secured on said latter mentioned shaft, said rollers adapted to contact material in said container and to carry the same on their surfaces for application to the toasted bun halves passing over said rollers, a gear on said roller shaft between said rollers, a housing extending over said latter mentioned gear and pivotally mounted on said roller shaft, the front end of said housing being open, a stub shaft mounted in said housing near said front end and having a pair of intermediate transfer gears secured thereon, one of said intermediate gears meshing with said roller shaft gear, the other of said intermediate gears adapted to rest against and mesh with said first mentioned centrally located gear on said first mentioned driven shaft when said container and roller shaft are arranged in operating position, whereby the bun halves leaving the discharge end of said toasting plate will pass over said rollers and have material from said container applied to their toasted faces by said rollers.

2. A bun treating machine of the character described including an oven, a toasting plate on said oven, conveyor means moving on said plate for sliding bun halves along said plate, said conveyor means including two pairs of endless chains and flights extending between each pair of chains, a driven shaft located near the discharging end of said toasting plate and near the end of said oven, sprockets on said shaft for said conveyor chains, a gear centrally located on said shaft between said pair of conveyor chains, an end wall extending upwardly from the bottom of said oven, an opening in said end wall adjacent said gear, a trough-like container having front, rear, end, and bottom walls, a bracket on the outside face of said end wall of said oven, cooperating elements on said bracket and on the front wall of said container for removably attaching said container beyond and below the discharging end of said toasting plate, a shaft removably and rotatably mounted in said container, a pair of identical spaced applicator rollers secured on said latter mentioned shaft, said rollers extending substantially up to the horizontal plane of said toasting plate when said container and rollers are mounted in place, said rollers adapted to contact material in said container and to carry the same on their surfaces for application to the toasted bun halves passing over said rollers, a gear on said roller shaft between said rollers, a housing extending over said latter mentioned gear and pivotally mounted on said roller shaft, the front end of said housing being open, a stub shaft mounted in said housing near said front end and having a pair of intermediate transfer gears secured thereon, one of said intermediate gears meshing with said roller shaft gear, the other of said intermediate gears adapted to rest against and mesh with said first mentioned centrally located gear on said first mentioned driven shaft when said container and roller shaft are arranged in operating position, whereby the bun halves leaving the discharge end of said toasting plate will pass over said rollers and have material from said container applied to their toasted faces by said rollers.

3. A bun treating machine of the character described, including an oven, a toasting plate extending over said oven, conveying means moving along longitudinally on said toasting plate for sliding bun halves on said plate, a driven shaft located near the end of said oven for operating said conveying means, an end wall on said oven below the discharging end of said plate, a gear secured on said shaft, said gear extending slightly beyond said end wall, an opening in said wall for said gear, a trough-like container having front, rear, end and bottom walls, means on the outside of said oven end wall and cooperating means on the front wall of said container for removably mounting said container on said oven end wall below the plane of said toasting plate, a roller shaft removably mounted in said end walls of said container, an applicator roller carried by said roller shaft, the top of said roller being substantially in the same horizontal plane as said toasting plate when said container is mounted on said oven wall and said roller shaft is mounted in said container; a roller gear secured on said roller shaft spaced from the end of said roller but located within said container when said roller shaft is mounted in said container, a housing pivotally mounted on said roller shaft and enclosing said roller gear, said housing having top, bottom, rear and side walls, the front end of said housing being open, a stub shaft mounted in said housing near the front end, a pair of intermediate transfer gears secured on said stub shaft, one of said intermediate gears meshing with said roller gear, the other of said intermediate gears adapted to rest on and mesh with said first mentioned gear on said driven shaft when said container is mounted on said oven wall and said roller shaft is mounted in said container, whereby the weight of said intermediate gears and the weight of the front of said housing will keep said other of said intermediate gears in meshing engagement with said first mentioned gear on said driven shaft when said roller is in operating position and whereby said housing with said intermediate gears will be removed from said container with said roller when said roller shaft is removed.

References Cited in the file of this patent
UNITED STATES PATENTS

| 1,753,879 | Carter et al. | Apr. 8, 1930 |
| 2,014,595 | Simmons | Sept. 17, 1935 |
| 2,027,002 | Spang | Jan. 7, 1936 |
| 2,225,068 | Marriott | Dec. 17, 1940 |